United States Patent [19]

Treat

[11] Patent Number: 4,751,728
[45] Date of Patent: Jun. 14, 1988

[54] TELEPHONE CALL MONITORING, METERING AND SELECTION DEVICE

[76] Inventor: John M. Treat, 2811 Laredo Dr., Hattiesburg, Miss. 39401

[21] Appl. No.: 30,619

[22] Filed: Mar. 27, 1987

[51] Int. Cl.$^4$ ........................................... H04M 15/00
[52] U.S. Cl. ................................... 379/113; 379/131; 379/114; 379/140
[58] Field of Search ............... 379/131, 112, 114, 386, 379/387, 113, 133, 140

[56] References Cited

U.S. PATENT DOCUMENTS

| | | | |
|---|---|---|---|
| 3,725,947 | 4/1973 | Albertini et al. | 379/114 X |
| 4,404,433 | 9/1983 | Wheeler et al. | 379/386 X |
| 4,585,904 | 4/1986 | Mincone et al. | 379/112 X |

*Primary Examiner*—Stafford D. Schreyer
*Attorney, Agent, or Firm*—Sherman Levy

[57] ABSTRACT

There is provided a telephone call monitoring, metering and selection device, the purpose of which is to select the lowest-cost way to make a call from one point to another point. The user will program the possible carriers and rates from a standard telephone and the user will enter the time, date, taxes and other information after plugging in the unit. After selecting the destination phone number, the device will show the rates of all possible carriers and then allow the user to choose or select a desired carrier. Because carriers do not have the same quality, the low-cost carrier may not always be the carrier the user wants to select. The unit will display all carrier rates on a one minute call, five minute call, ten minute call and the like. The device will show the user on a real time basis what the calls may cost. The costing feature will apply to local and long distance calls. Also, the device can be programmed to keep a total of what the calls have been from a beginning of a billing cycle and previous billing cycles.

15 Claims, 1 Drawing Sheet

U.S. Patent    Jun. 14, 1988    4,751,728
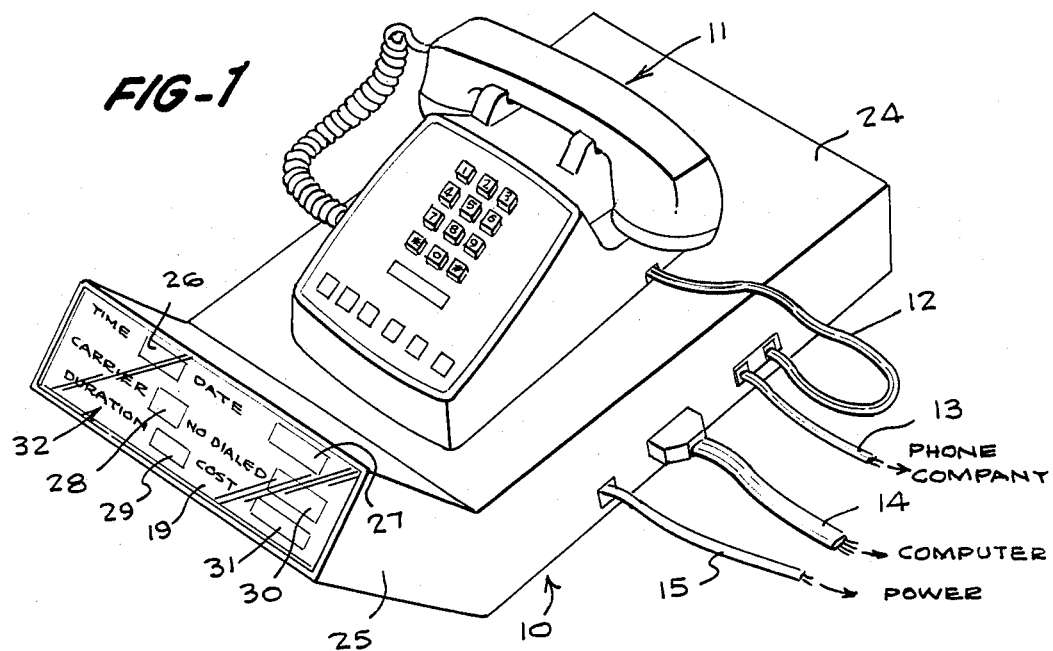
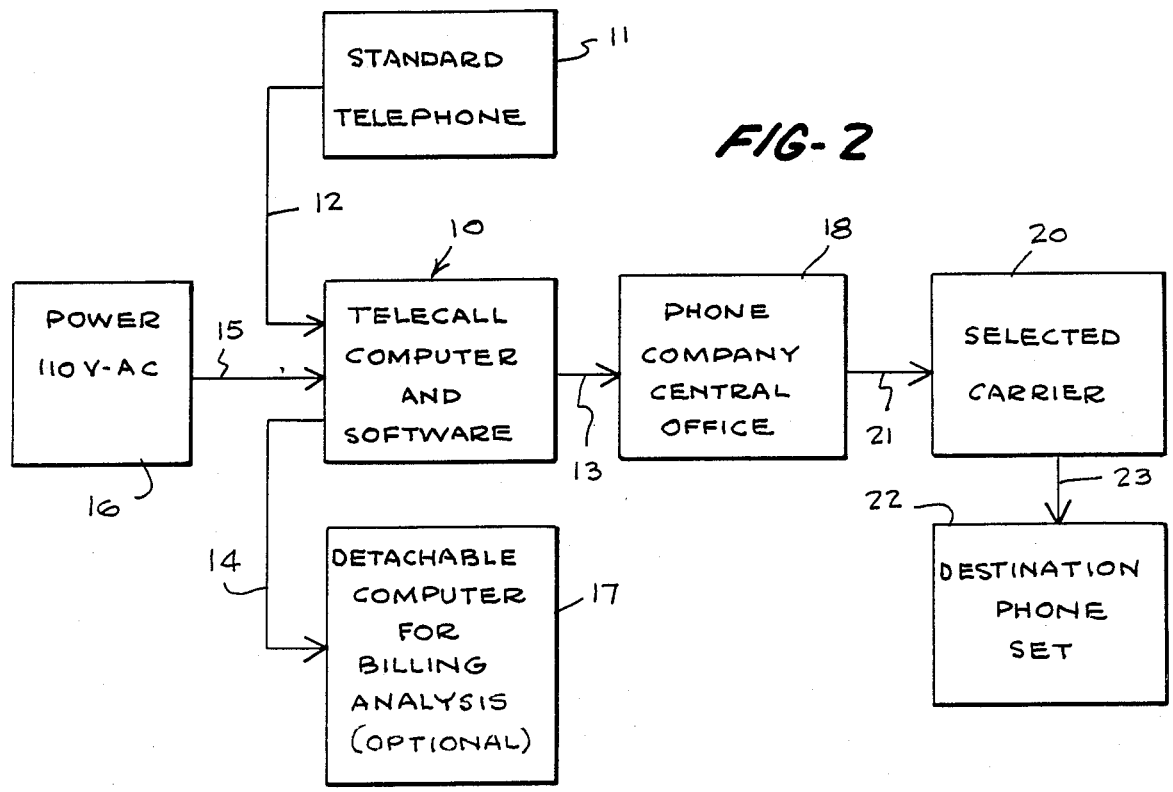

TELEPHONE CALL MONITORING, METERING AND SELECTION DEVICE

BACKGROUND OF THE INVENTION

The present invention generally appertains to improvements in telephone call monitoring, metering and selection devices.

DISCUSSION OF THE PRIOR ART

Telephone call metering devices are well known as, for example, as shown in prior U.S. Pat. Nos. 4,122,308, 4,481,383, 4,559,416, 4,585,904. In prior patented devices, there are shown various communication billing systems and the like. Prior devices have been provided for monitoring and recording information concerning one or more telephone lines. U.S. Pat. No. 4,585,904 shows a device for rating phone calls with a special key pad. U.S. Pat. No. 4,224,472 discloses a device for apportioning charges from coin operated telephones.

Other prior patents such as U.S. Pat. Nos. 4,041,291, 4,122,308, and 4,585,904 show various types of special telephone devices or systems, and none of the prior patents show uses of a standard telephone set but a special telephone set. However, neither these prior patents nor any others known to applicant achieve the results accomplished by nor bear upon the claims of the present invention.

OBJECTS AND SUMMARY OF THE PRESENT INVENTION

A primary object of the present invention is to provide a simple and inexpensive unit that attaches to a phone plug inlet and permits the user to not only know what they are being charged for both local and long distance calls, but in addition the device will have the capability of selecting the cheapest carrier.

Another important object of the present invention is to provide a telephone call monitoring, metering and selection device that will show the user the cheapest local and long distance telephone call carrier and allow the user to select the carrier of their choice.

Another major object of the present invention is to provide a telephone call monitoring, metering and selection device that will automatically connect to the selected carrier, and the user will be allowed to observe the rates, carriers and the like by pressing a series of telephone keys, and this low cost device will be attached to a common telephone.

Another major object of the present invention is to provide a telephone call monitoring, metering and selection device that can be inexpensively manufactured and which will accomplish the desired purposes with maximum efficiency.

Another object, advantage and feature of the invention is to provide telephone system apparatus that is constructed and arranged to provide selection of a low-cost carrier, or a selected one of an assortment of low-cost carriers, or a selected carrier of one's choice, it is to be emphasized that the present invention does not operate on coin telephones and does not apportion charges.

Another and further object of the invention is to provide a telephone system apparatus that uses a standard telephone set and is unique so that it includes the potential of user entry of a selection of carriers, rates, taxes, carrier access numbers as well as other possible features.

It will therefore be seen that there has been provided a telephone call monitoring, metering and selection device whose purpose is to select a low-cost way to make a call from point A to point B. The user will program the possible carriers and rates from a standard telephone set. The user will enter the selection of time, date, taxes and other information after plugging in the unit. After selecting the destination phone number, the device will show the rates of all possible carriers and then allow the user to choose a carrier. Because carriers do not have the same quality, selection of the low-cost carrier may not always be the carrier the user wants to select for his use. The unit of the invention is adapted to display all carrier rates on a one minute call, a five minute call, a ten minute call and the like.

Further, the device of the invention will show a user on a real time basis what the call is costing the user. It is to be noted that this costing feature will apply to local and long distance calls. The device may of course be programmed to maintain a total amount of what the calls have been from the beginning of a billing cycle as well as from any previous billing cycles.

Further, other features may be programmed into the device to sound a tone after a call has been in for process a specified period of time. Another feature that may be programmed will force the user to enter a 'password' to use the phone and this can cut down on unauthorized use of the telephone set. A still further feature that can be programmed into the device will be to show the user what time it is at the destination phone number. A further feature that can be programmed will allow the user to save the call amount and a particular account number that can allow the user to bill that account at a later date. Other features can be programmed to sound signals for various programmed meeting times.

It is to be noted that computer software will handle all of the call rating. Some support hardware will be used and provided to detect such things or events as 'on-hook', and 'off-hook'. After the user selects a carrier, an automatic dialing method will select an appropriate carrier. This allows the user to dial the destination telephone number and then select a carrier for ease of use.

It will therefore be seen that there is provided a low-cost unit at, for example, an estimated cost of less than $100 depending on the option selected, that will increase the efficiency of business calls and decrease costs a company or individual will pay for their telephone call bills. Further, the device of the invention will allow the user to keep a record of the calls that were made to each carrier, so they can verify their bill from each carrier when it is received.

These and other objects of the present invention will become apparent with reference to the drawings, the description of the preferred embodiment, and the appended claims.

BRIEF DESCRIPTION OF THE DRAWINGS

FIG. 1 is a perspective view illustrating the present invention.

FIG. 2 is a schematic view illustrating the present invention.

DESCRIPTION OF THE PREFERRED EMBODIMENT

Referring in detail to the drawings, and more particularly to FIGS. 1 and 2 of the drawings, the numeral 10 indicates the telephone call monitoring, metering and selection device, and the numeral 11 indicates a standard telephone which is connected to the device 10 as at 12. The device 10 is adapted to be connected to a phone company central office 18 by a connection 13. A detachable computer 17 may be provided for billing analysis, FIG. 2, and such a computer 17 may be optional and may be connected to the device 10 as at 14. A power supply 16 is adapted to be connected to the device as at 15.

In FIG. 2 there is illustrated diagrammatically or schematically, a selected carrier 20 which can be connected as at 21 to the phone company central office, and in FIG. 2 the numeral 22 indicates a destination phone set which can be connected as at 21 to the phone company central office, and in FIG. 2 the numeral 22 indicates a destination phone set which can be suitably connected to the selected carrier 20 as at 23.

As shown in FIG. 1, the device 10 may include a housing 24 which has an offset portion 25 that is provided with a viewing area 32. The viewing area 32 may include a screen 19 that includes a viewing portion 26 for time, an area 27 for indicating the date, an area 28 for indicating the carrier, an area for indicating the duration of the call, an area 30 for indicating the number dialed, and an area 31 for indicating the cost of the call.

It will therefore be seen that there has been provided a device 10 that can consist of a unit that attaches to a phone plug inlet and will allow the user to not only know what they are being charged for both local and long distance calls, but the device will also have the capability of selecting the cheapest carrier. At the present time, with the latest telephone equipment, the user can choose both local and long distance carriers for their phone calls.

The new device 10 will show the user on a viewing area 32 that consists of the easy to read screen 19 that is arranged in the offset portion 25, the cheapest local and long distance telephone call carrier and will permit the user to select the carrier of their choice. The device 10 is to be attached to the telephone 11 so as to automatically connect the call to the selected carrier as indicated by the numeral 20 in FIG. 2. The user will be allowed to change the rates, carriers and the like by pressing a series of telephone keys, and this low-cost device 10 is adapted to be attached to a common telephone.

The telephone call monitoring metering and selection device 10 includes computer and software that will handle call rating information provided it by the software for the telephone call monitoring, metering and selection device 10, and the viewing area 32 with screen 19 and the viewing portion 26, for indicating time, date, a given carrier, the number dialed, time interval or duration of a given call, cost of the call determined for various routes found available to the telephone call monitoring, metering and selection device 10, which is shown operatively connected to the telephone set 11. Also capable of being shown in the viewing area 32 on a real time basis is the cost of the call and so that the costing feature will apply to local and long distance calls. The device 10 can be programmed to maintain a record of the total amount of calls that have been placed from a beginning of a reference billing cycle and previous billing cycles, to a present reference point in time.

Also the computer and software can provide data to energize a tone that can be sounded after the call has been in process for a specified interval of time. The computer with its software can be programmed to force a use to user a given password to use the telephone set so as to cut down unauthorized use of the telephone set; further, it can be programmed to show the user what time it is at the destination telephone set 22; and further, it can be programmed to allow a user to determine the call amount cost of a particular account number and that will allow the user to bill that account at a later date.

The telephone computer and software can handle all of the call ratings with any ancillary supporting hardware to detect such characterizations as 'on hook', and 'off-hook', selecting a carrier, actuate an automatic dialing unit for selecting an appropriate carrier. Thus, the computer and its attending software that allows the user to dial a destination telephone number, and also then selects a carrier for ease of use.

The software of the telephone computer of the device 10 further provides a low cost, or a lower cost, determination that is performed that will increase the efficiency of business calls and decrease the amount of cost that a company or individual will pay for phone bills and it will also permit a user to keep a record of the calls that were made to each carrier so that the record of the calls can be used to verify the bills from each carrier after it is received.

The software of the telephone computer includes a telephone plug inlet and will allow a user to determine not only what is being charged in detail for local and long distance calls, and a data selector for the capability of selecting a low cost carrier. Long distance data includes overseas calls. The data selector includes the capability that will allow the user to select a carrier of one's choice, and to select a lowest cost way to make a call from point A to point B.

By means of the software of the computer and its display, the computer provides quick or instantaneous rating of phone calls as the calls are made so that the user will be able to see how long they have been on the call using the given telephone set as well as how much the given call has cost the user.

The software can be used to predict, calculate and determine form pre-stored data, an average price per minute, or other units of minutes per call, for each carrier a user may request, and conventional means including storage and automatic dial apparatus, that automatically dials that selected carrier to place a selected low cost call, and memory display, such as a PC, into which is dumpted information to give a detailed summary of completed telephone calls. Further, it is within the purview of the use of the computer software that any telephone carrier can be selected.

As shown in FIG. 2, there is illustrated schematically a standard telephone 11, as well as a standard 110 volt AC source of electrical energy, and numeral 10 indicates the device which may be in the form of the computer and software, the numeral 17 indicates a detachable computer for billing analysis which can be an optional feature. Also in FIG. 2 the numeral 18 indicates the phone company central office, and the numeral 20 indicates the selected carrier and the numeral 22 indicates the destination phone set.

It will therefore be seen that there has been provided a computerized phone rating device and the device will give instantaneous rating of a phone call as it takes place. The customer will be able to see how long they have been on the phone as well as how much the call has cost them. The machine or device 10 is adapted to rate local and long distance calls being received from any call carrier such as AT&T, MCI, GTE and the like.

One embodiment or version of the device will be able to predict the average price per minute for each carrier the customer has requested and automatically dial that carrier to place the cheapest call. One version of the device will be able to dump information to a personal computer to give a detail and a summary of the calls. Another version or embodiment of the device of the invention will allow a user to see the total amount of the bill they have accumulated so far. A further version of the device will be able to beep to user with an audible tone, to signify that the call has taken five minutes.

A device 10, as shown in FIG. 1, is adapted to sit under most desk top phones in a plastic cabinet, and it will have a power cord and a place to plug into the phone line. One version of the device will be attached to the wall for wall phones.

It is recognized that automatic dialing equipment has previously been provided, but such equipment does not have the capability of selecting a phone carrier as does the apparatus of the present invention. In FIG. 1 the numeral 32 indicates the viewing area.

The parts can be made of any suitable material and in different shapes or sizes as desired or required.

It will therefore been seen that there has been provided a device which has much flexibility and will automatically arrange for the least expensive route to be followed so that the least expensive carrier will be selected. Thus, the device functions as a traffic controller and provides for the least cost routing.

Other important features includes flexibility and efficiency, and it is to be understood that other accessories can be used or provided as desired or required, and, for example, a suitable printout feature can be combined with the present invention.

While I have specifically described the preferred embodiment of my invention, it is to be understood that the invention is not so limited, but may be otherwise embodied and practiced within the scope of the following claims.

What is claimed is:

1. A telephone call monitoring, metering and selection device comprising
    a housing for a telephone call monitoring, metering and selection means and having an offset portion,
    a telephone computer responsive to software means for the telephone call monitoring, metering and selection means,
    a viewing area in said offset portion,
    said viewing area including a display area for indicating time, date, carrier, the number dialed, duration of a call, and cost of the call determined for various routes available to the telephone call monitoring, metering and selection means;
    said telephone call monitoring, metering and selection means having a telephone set operatively connected thereto,
    means for supplying power to said telephone call monitoring, metering and selection means,
    means for operatively connecting the telephone call monitoring, metering and selection means to a phone company office, and
    a selected carrier and including further means for connection to a destination telephone set operatively connected to the telephone call monitoring, metering and selection means.

2. The structure as defined in claim 1 wherein a hand telephone set is used as the telephone set.

3. The structure as defined in claim 2 wherein the telephone call monitoring, metering and selection means includes means which will show on a display means to the user on a real time basis what the call is costing and wherein the telephone call monitoring, metering and selection means further includes means so this costing feature will apply to local and long distance calls.

4. The structure as defined in claim 3 wherein the telephone call monitoring, metering and selection means can be programmed to keep a total amount of calls that have been placed from a beginning of a billing cycle and previous billing cycles.

5. The structure as defined in claim 4 wherein there is means that provides for a tone that can be sounded after the call has been in process for a specified amount of time.

6. The structure as defined in claim 5 wherein the telephone call monitoring, metering and selection means includes means which can be programmed to force the user to use a password to use the telephone set so as to cut down unauthorized use of the telephone set.

7. The structure as defined in claim 6 wherein the telephone call monitoring, metering and selection means includes means which can be programmed to show the user what time it is at the destination telephone set.

8. The structure as defined in claim 7 wherein the telephone call monitoring, metering and selection means includes means which can be programmed to allow the user to determine the call amount of a particular account number and that will allow the user to bill that account at a later date.

9. The device as defined in claim 8 which includes means which consists of a low cost unit that will increase the efficiency of business calls and decrease the amount that a company or individual will pay for the phone bills and it will also permit a user to keep a record of the calls that were made to each carrier so that the record of the calls can be used to verify the bills from each carrier after it is received.

10. The structure as defined in claim 9 wherein the telephone call monitoring, metering and selection means includes means which attaches to a telephone plug inlet, and
    includes means which will allow the user to know not only what they are being charged for most local and long distance calls but the telephone call monitoring, metering and selection means will have the capability of selecting the cheapest carrier.

11. The device as defined in claim 10 wherein the telephone call monitoring, metering and selection means includes means which will show the user the cheapest local and long distance telephone call carrier, and
    includes means which will allow the user to select the carrier of their choice.

12. The device as defined in claim 11 includes means whose purpose is to select the cheapest way to make a call from point A to point B.

13. The device as defined in claim 12 wherein there is provided a computer telephone rating device which will give instantaneous rating of a phone call as it takes place so that the customer will be able to see how long they have been on the call using the telephone set as well as how much that call has cost.

14. The device as defined in claim 13 wherein the telephone call monitoring, metering and selection means includes means which can predict the average price per minute for each carrier the customer has requested, and includes means which automatically dial that carrier to place the cheapest call, and wherein the device includes means which can dump information to a personal computer to give a detailed summary of the calls.

15. The device as defined in claim 14 wherein the telephone call monitoring, metering and selection means includes means which has the capability of selecting any telephone carrier.

* * * * *